(12) United States Patent
Orot et al.

(10) Patent No.: US 12,468,802 B2
(45) Date of Patent: Nov. 11, 2025

(54) KERNEL-BASED PROTECTION OF COMPUTER PROCESSES

(71) Applicant: Island Technology, Inc., Dallas, TX (US)

(72) Inventors: Yoav Orot, Somerville, MA (US); Gal Kaplan, Tel Aviv (IL); Roi Leibovich, Tel Aviv (IL); Dan Amiga, Ramat Hasharon (IL)

(73) Assignee: ISLAND TECHNOLOGY, INC., Dallas, TX (US)

( * ) Notice: Subject to any disclaimer, the term of this patent is extended or adjusted under 35 U.S.C. 154(b) by 170 days.

(21) Appl. No.: 18/522,402

(22) Filed: Nov. 29, 2023

(65) Prior Publication Data

US 2024/0176876 A1 May 30, 2024

Related U.S. Application Data

(60) Provisional application No. 63/428,748, filed on Nov. 30, 2022.

(51) Int. Cl.
*G06F 21/00* (2013.01)
*G06F 21/54* (2013.01)

(52) U.S. Cl.
CPC ........ *G06F 21/54* (2013.01); *G06F 2221/032* (2013.01)

(58) Field of Classification Search
None
See application file for complete search history.

(56) References Cited

U.S. PATENT DOCUMENTS

| | | | |
|---|---|---|---|
| 11,113,086 B1* | 9/2021 | Steinberg | G06F 9/45558 |
| 11,314,859 B1* | 4/2022 | Singh | G06F 21/554 |
| 11,366,931 B2* | 6/2022 | Goodridge | G06F 12/1416 |
| 11,449,602 B1* | 9/2022 | Tumblin | G06F 21/602 |
| 2013/0227279 A1 | 8/2013 | Quinlan et al. | |
| 2021/0089647 A1* | 3/2021 | Suwad | G06F 21/552 |
| 2021/0117246 A1* | 4/2021 | Lal | G06F 9/3814 |
| 2021/0312057 A1* | 10/2021 | Kloth | G06F 21/575 |
| 2022/0004623 A1* | 1/2022 | Trabelsi | H04L 63/029 |

(Continued)

OTHER PUBLICATIONS

Wang, Xueyang; Karri, Ramesh. Reusing Hardware Performance Counters to Detect and Identify Kernel Control-Flow Modifying Rootkits. IEEE Transactions on Computer-Aided Design of Integrated Circuits and Systems, vol. 35, Issue: 3. https://ieeexplore.ieee.org/stamp/stamp.jsp?tp=&arnumber=7229276 (Year: 2016).*

(Continued)

*Primary Examiner* — Jeremiah L Avery

(74) *Attorney, Agent, or Firm* — AlphaPatent Associates Ltd.; Daniel J. Swirsky

(57) ABSTRACT

Computer security apparatus including a kernel driver configured to be executed by a computer in a kernel mode and to thereupon perform protecting a process of a first computer software application executed by the computer, where the protecting is performed in accordance with a protection policy, receiving an instruction from the process to modify the protection policy, modifying the protection policy in accordance with the instruction, and protecting the process in accordance with the protection policy after it has been modified in accordance with the instruction.

16 Claims, 7 Drawing Sheets

(56) References Cited

U.S. PATENT DOCUMENTS

| | | | | |
|---|---|---|---|---|
| 2022/0137996 | A1* | 5/2022 | Mooring | G06F 9/45545 718/1 |
| 2022/0207139 | A1* | 6/2022 | Strogov | G06F 21/52 |
| 2022/0215101 | A1* | 7/2022 | Rioux | G06F 21/577 |
| 2022/0222338 | A1* | 7/2022 | Gupta | G06F 21/554 |
| 2022/0269802 | A1* | 8/2022 | Iyer | G06F 21/84 |
| 2022/0382855 | A1* | 12/2022 | Burenkov | G06F 21/53 |
| 2023/0062436 | A1* | 3/2023 | Christner | G06F 16/13 |
| 2023/0229761 | A1* | 7/2023 | Laplante | G06F 21/566 726/22 |

OTHER PUBLICATIONS

Tian, Donghai et al. A practical online approach to protecting kernel heap buffers in kernel modules. China Communications, vol. 13, Issue: 11. https://ieeexplore.ieee.org/stamp/stamp.jsp?tp=&arnumber=7781725 (Year: 2016).*

Sun, Jianhua et al. A Virtualized Harvard Architectural Approach to Protect Kernel Code. 2009 First International Workshop on Education Technology and Computer Science. https://ieeexplore.ieee.org/stamp/stamp.jsp?tp=&arnumber=4959205 (Year: 2009).*

Kurtz, et al., "Towards a Framework for Android Security Modules: Extending SE Android Type Enforcement to Android Middleware", TU biblio, Nov. 1, 2012, TU Darmstadt, Hesse, Germany.

Bugiel, et al., "Flexible and Fine-Grained Mandatory Access Control on Android for Diverse Security and Privacy Policies", Proc. 22nd Usenix Security Symp., Sep. 28, 2013, pp. 131-146, USENIX: The Advanced Computing Systems Association, Berkeley, California, USA.

Bugiel, et al., "Towards a Framework for Android Security Modules: Extending SE Android Type Enforcement to Android Middleware", TU biblio, Nov. 1, 2012, TU Darmstadt, Hesse, Germany.

Deyannis, et al., "Andromeda: Enabling Secure Enclaves for the Android Ecosystem", International Conference on Information Security, Nov. 2021, pp. 195-217, ICISC, Republic of Korea.

* cited by examiner

KERNEL-BASED PROTECTION OF COMPUTER PROCESSES

FIELD

The invention relates generally to computer security.

BACKGROUND

Modern computer operating system typically maintain separate "user space" and "kernel space" regions of computer memory. Kernel space is accessed directly by operating system components, a main component of which is known as the "kernel," as well as by various kernel drivers and hardware device drivers, when they are executed by the computer's central processing unit (CPU) in "kernel mode". User space memory is allocated to user processes, which are instances of software applications that are not operating system components, such as web browsers and word processing software, where user processes are typically executed by the CPU in "user mode". Kernel space can be accessed by user processes only indirectly through the use of system calls, which are requests that are sent by user processes to the operating system, where such requests are for services that are performed by the kernel.

One common kernel task is to protect user processes and their associated resources by simply preventing access thereto by other user processes. However, as malicious parties employ various ways to compromise computer security, new computer security methods ought to be contemplated.

SUMMARY

In one aspect of the invention a computer security method is provided including protecting a process of a first computer software application executed by a computer, where the protecting is performed in accordance with a protection policy, receiving an instruction from the process to modify the protection policy, modifying the protection policy in accordance with the instruction, and protecting the process in accordance with the protection policy after it has been modified in accordance with the instruction, where the protecting, receiving, and modifying are performed by a kernel driver executed by the computer.

In another aspect of the invention any of the protecting, receiving, and modifying are performed after determining that a digital signature is valid, where the digital signature is of an executable file of the first computer software application, and where the determining is performed by the kernel driver executed by the computer.

In another aspect of the invention the protecting includes detecting an attempt, by a process of a second computer software application executed by the computer, to access an object associated with the first computer software application, determining whether a digital signature is valid, where the digital signature is of an executable file of the second computer software application, and allowing or preventing access to the object by the second computer software application in accordance with the protection policy, where the protection policy is at least partly based on whether the digital signature is valid, where the detecting, determining, allowing, and preventing are performed by the kernel driver executed by the computer.

In another aspect of the invention the protecting includes receiving a decryption key from the process of the first computer software application, receiving a request from the process of the first computer software application to receive the decryption key, determining whether a digital signature is valid, where the digital signature is of the first computer software application, and providing or not providing the decryption key to the process in accordance with the protection policy, where the protection policy is at least partly based on whether the digital signature is valid, where the receiving, determining, allowing, providing, and not providing are performed by the kernel driver executed by the computer.

In another aspect of the invention the method further includes encrypting the decryption key after receiving the decryption key from the process of the first computer software application, and decrypting the encrypted decryption key, if the digital signature is valid, prior to providing the decryption key to the process of the first computer software application.

In another aspect of the invention the protecting includes receiving an encrypted message from the process of the first computer software application, where the message is encrypted using a public key of a key pair, determining whether a digital signature is valid, where the digital signature is of an executable file of the first computer software application, and if the digital signature is valid, decrypting the encrypted message using a private key of the key pair, encrypting a response to the message using the private key, and providing the encrypted response to the process of the first computer software application, where the receiving, determining, decrypting, encrypting, and providing are performed by the kernel driver executed by the computer.

In another aspect of the invention computer security apparatus is provided including a kernel driver configured to be executed by a computer in a kernel mode and thereupon to perform protecting a process of a first computer software application executed by the computer, where the protecting is performed in accordance with a protection policy, receiving an instruction from the process to modify the protection policy, modifying the protection policy in accordance with the instruction, and protecting the process in accordance with the protection policy after it has been modified in accordance with the instruction.

In another aspect of the invention the kernel driver is configured to perform any of the protecting, receiving, and modifying after the kernel driver determines that a digital signature is valid, where the digital signature is of an executable file of the first computer software application.

In another aspect of the invention the kernel driver is configured to perform the protecting by detecting an attempt, by a process of a second computer software application executed by the computer, to access an object associated with the first computer software application, determining whether a digital signature is valid, where the digital signature is of an executable file of the second computer software application, and allowing or preventing access to the object by the second computer software application in accordance with the protection policy, where the protection policy is at least partly based on whether the digital signature is valid.

In another aspect of the invention the kernel driver is configured to perform the protecting by receiving a decryption key from the process of the first computer software application, receiving a request from the process of the first computer software application to receive the decryption key, determining whether a digital signature is valid, where the digital signature is of the first computer software application, and providing or not providing the decryption key to the process in accordance with the protection policy, where the protection policy is at least partly based on whether the digital signature is valid, where the receiving, determining, allowing, providing, and not providing are performed by the kernel driver executed by the computer.

In another aspect of the invention the kernel driver is configured to encrypt the decryption key after receiving the decryption key from the process of the first computer software application, and decrypt the encrypted decryption key, if the digital signature is valid, prior to providing the decryption key to the process of the first computer software application.

In another aspect of the invention the kernel driver is configured to perform the protecting by receiving an encrypted message from the process of the first computer software application, where the message is encrypted using a public key of a key pair, determining whether a digital signature is valid, where the digital signature is of an executable file of the first computer software application, and if the digital signature is valid, decrypting the encrypted message using a private key of the key pair, encrypting a response to the message using the private key, and providing the encrypted response to the process of the first computer software application.

In another aspect of the invention the first computer software application is a web browser.

In another aspect of the invention where the object is a process or a thread of a process.

BRIEF DESCRIPTION OF THE DRAWINGS

Aspects of the invention will be understood and appreciated more fully from the following detailed description taken in conjunction with the appended drawings in which.

DETAILED DESCRIPTION

Figure 1:
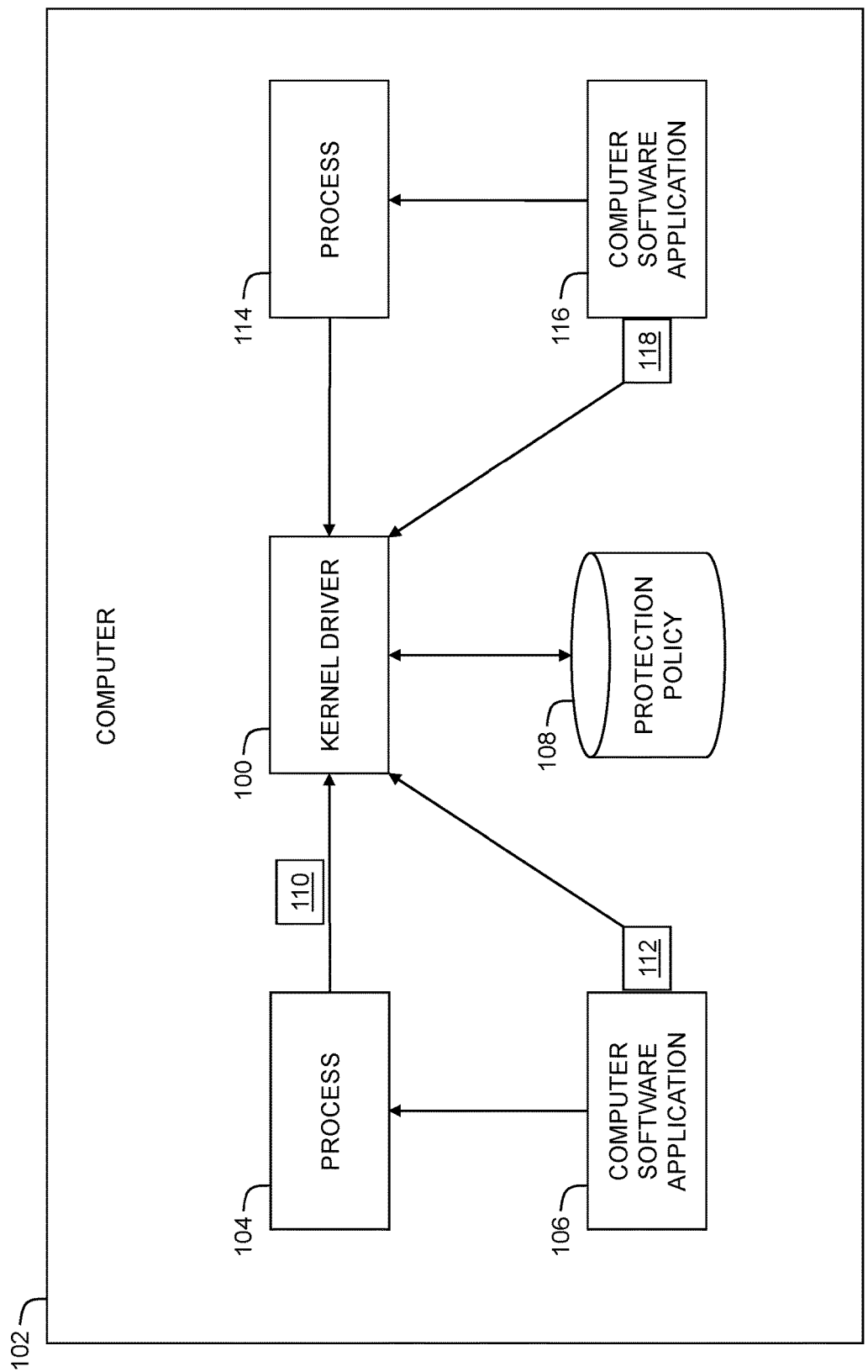
FIG. 1 is a simplified conceptual illustration of a system of a computer security system, constructed and operative in accordance with an embodiment of the invention.
Figure 2:
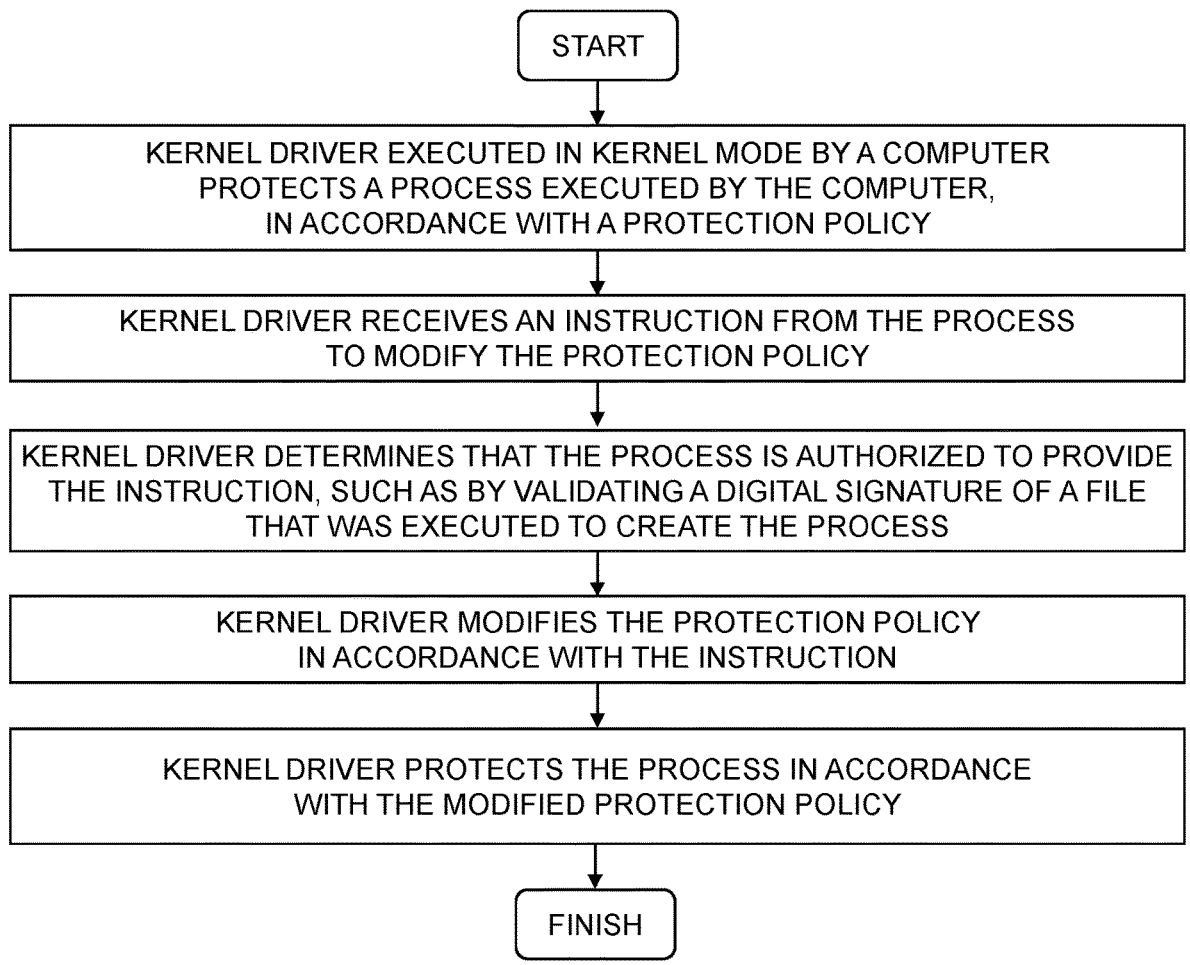
FIG. 2 is a simplified flowchart diagram of an exemplary method of operation of the system of FIG. 1, operative in accordance with an embodiment of the invention.
Figure 3:
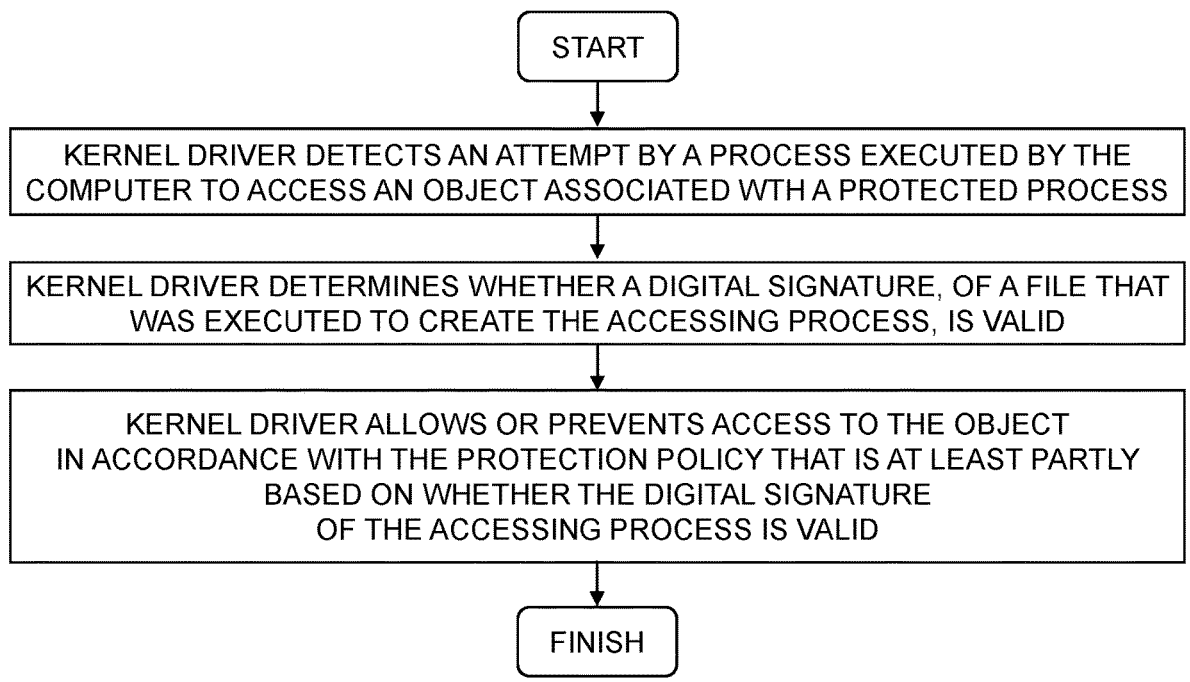
FIG. 3 is a simplified flowchart diagram of an exemplary method of operation of the system of FIG. 1, operative in accordance with an embodiment of the invention.

Reference is now made to FIG. 1, which is a simplified conceptual illustration of a computer security system, constructed and operative in accordance with an embodiment of the invention, and additionally to FIGS. 2 and 3, which are simplified flowchart diagrams of exemplary methods of operation of the system of FIG. 1, operative in accordance with an embodiment of the invention. In the system of FIG. 1 and methods of FIG. 2 and FIG. 3, a kernel driver 100 is configured in accordance with conventional techniques to be executed by a computer 102 in kernel mode, such as where computer 102 runs the Windows™ operating system, commercially available from Microsoft Corporation of Redmond, WA.

In accordance with an embodiment of the invention, kernel driver 100 is configured to protect a process 104, where process 104 is an instance of a computer software application 106 that is also executed by computer 102. In one embodiment, computer software application 106 is a software application that is not an operating system component, such as the Enterprise Browser™, commercially available from Island Technology, Inc. of Dallas, TX, or another web browser or word processing software. In another embodiment, computer software application 106 is an operating system component, such as a kernel driver or a hardware device driver. In one embodiment, kernel driver 100 is configured to determine that computer software application 106 is among one or more specific computer software applications or types of computer software applications whose processes kernel driver 100 is configured to protect.

Further in accordance with an embodiment of the invention, kernel driver 100 is configured to protect process 104 in accordance with one or more protection policies, collectively referred to herein as protection policy 108. In one embodiment, protection policy 108 is preconfigured with kernel driver 100. In another embodiment, protection policy 108 is provided to kernel driver 100, such as by process 104 or by an administrator of computer 102. Protection policy 108 may indicate any type of protection known to be provided by any known operating system kernel or kernel driver for any process executed by a computer, such as by controlling access to process 104 or any object associated with process 104, such as its memory space, threads, handles, process environment settings, execution contexts, process and thread environment blocks, and loaded modules.

Further in accordance with an embodiment of the invention, kernel driver 100 is configured to receive an instruction 110 from process 104 to modify protection policy 108, such as in the form of a system call. In one example, protection policy 108 disallows requests by user processes other than process 104 to access locations within the memory of computer 102 that are allocated to process 104, such as memory locations in which executable instructions of process 104 are stored and memory locations into which process 104 stores data. Instruction 110 then indicates that this protection is to be modified to allow requests by specified user processes to receive such access. Kernel driver 100 is further configured to modify protection policy 108 in accordance with instruction 110, preferably after kernel driver 100 determines, in accordance with conventional techniques, that process 104 is authorized to provide such instructions. In one embodiment, kernel driver 100 determines that process 104 is so authorized by determining that a digital signature 112 of computer software application 106 is valid, such as where computer software application 106 is an executable file that was executed by computer 102 to create process 104. Kernel driver 100 then continues to protect process 104 in accordance with protection policy 108 after it has been modified in accordance with instruction 110.

In one embodiment, kernel driver 100 is configured to identify a process 114 as being an instance of a computer software application 116 that is also executed by computer 102, for the purpose of enabling kernel driver 100 to determine, in accordance with protection policy 108, whether or not requests by process 114 to be given access to process 104 or any object associated with process 104 are to be allowed. In one embodiment, kernel driver 100 is configured to determine that computer software application 116 is among one or more specific computer software applications or types of computer software applications that kernel driver 100 is configured to evaluate in this manner. In one embodiment, kernel driver 100 is configured to determine whether a digital signature 118 of computer software application 116 is valid, such as where computer software application 116 is an executable file that was executed by computer 102 to create process 114, where protection policy 108 is at least partly based on whether the digital signature is valid. Where computer 102 runs the Windows™ operating system, kernel driver 100 may be configured to monitor access requests to process and thread objects by registering a callback to the OS object operation callback facility, such as by using the ObRegisterCallbacks routine family. Kernel driver 100 may be configured to specifically monitor access to PsProcessType and PsThreadType objects.

Figure 4:
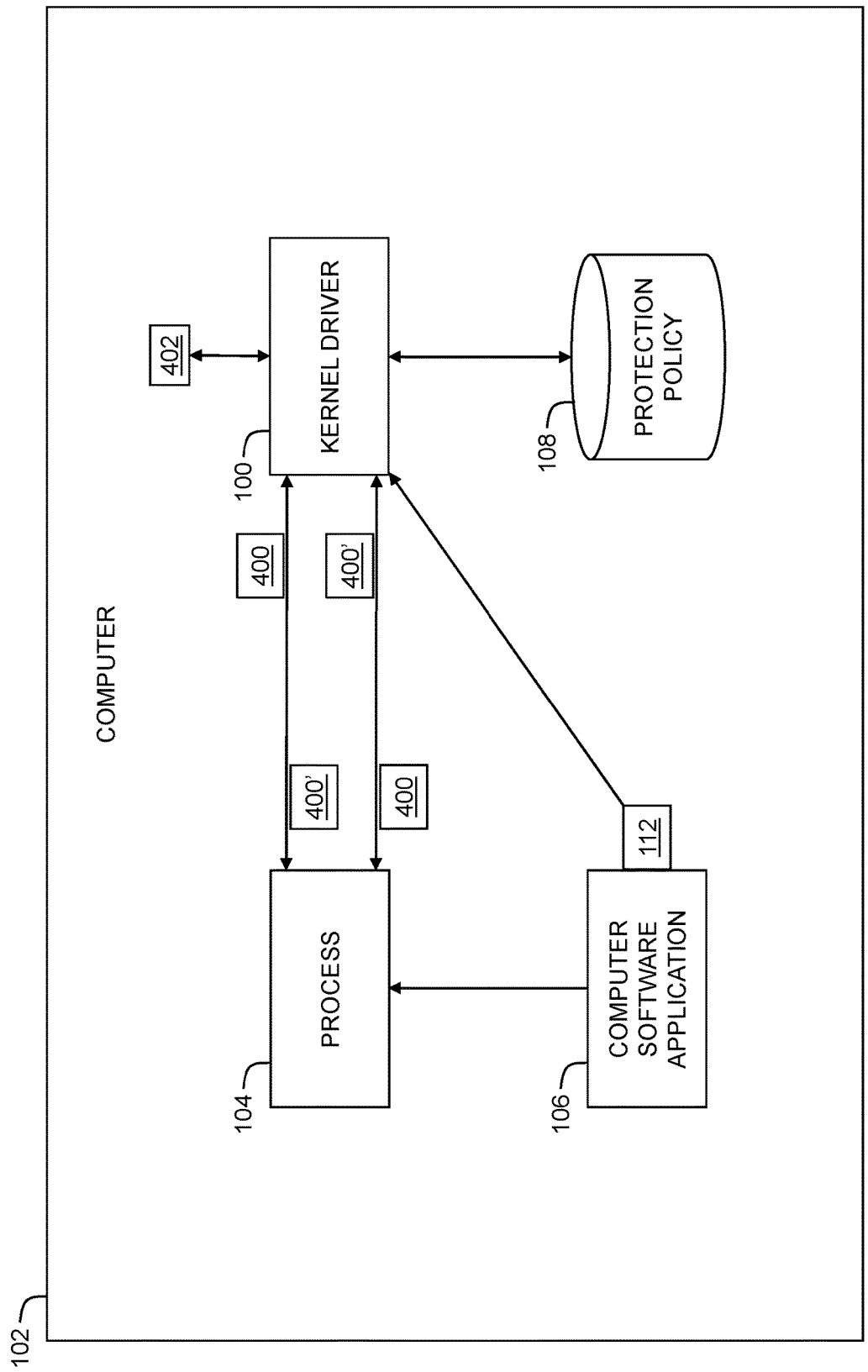
FIG. 4 is a simplified conceptual illustration of a computer security system, constructed and operative in accordance with an embodiment of the invention.
Figure 5:
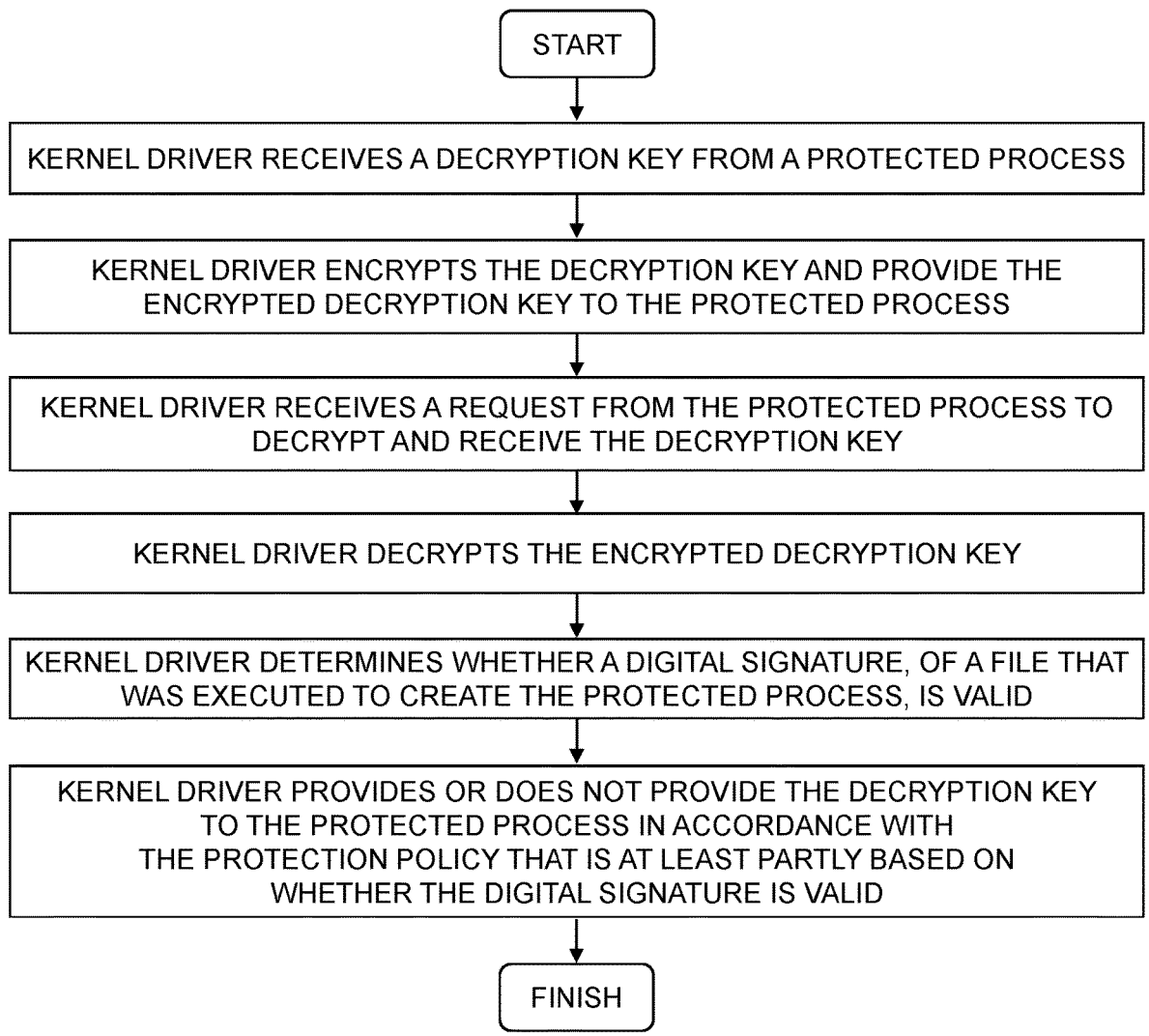
FIG. 5 is a simplified flowchart diagram of an exemplary method of operation of the system of FIG. 4.

Reference is now made to FIG. 4, which is a simplified conceptual illustration of a computer security system, constructed and operative in accordance with an embodiment of the invention, and additionally to FIG. 5, which is a simplified flowchart diagram of an exemplary method of operation of the system of FIG. 4, operative in accordance with an embodiment of the invention. The system of FIG. 4 is substantially similar to the system of FIG. 1 except as is otherwise described hereinbelow. In the system of FIG. 4 and method of FIG. 5, kernel driver 100 is configured to protect process 104 by receiving a decryption key 400 from process 104, such as where process 104 uses decryption key 400 to decrypt data that are encrypted by process 104. Kernel driver 100 then encrypts decryption key 400, such as by using an encryption/decryption key 402 generated by kernel driver 100 or acquired elsewhere, and returns encrypted decryption key 400, now denoted as element 400', to process 104.

In one embodiment kernel driver 100 stores encryption/decryption key 402 in a special registry key that are protected by kernel driver 100, in accordance with conventional techniques, from access by unauthorized processes. Where computer 102 runs the Windows™ operating system, this may be done by registering the kernel driver 100 as a registry filter driver using the kernel registry filtering infrastructure as provided by the CmRegisterCallback routine family and blocking access to the special registry key by any process, except when requested by process 104 and if allowed by protection policy 108.

Thereafter, such as when process 104 wishes to decrypt data that may be decrypted using decryption key 400, process 104 sends encrypted decryption key 400' to kernel driver 100 and requests its decryption, whereupon kernel driver 100 retrieves encryption/decryption key 402, decrypts encrypted decryption key 400', and provides the decrypted decryption key 400 to process 104. In this manner, process 104 need not maintain its own copy of decryption key 400. In one embodiment, kernel driver 100 determines, as described above, whether digital signature 112 of process 104's executable file, is valid, and then provides, or doesn't provide, decrypted decryption key 400 to process 104 in accordance with protection policy 108, where protection policy 108 is at least partly based on whether the digital signature is valid. In one embodiment, encryption/decryption key 402 includes separate encryption and decryption keys to encrypt and decrypt decryption keys 400 and 400' respectively in accordance with conventional techniques.

Figure 6:
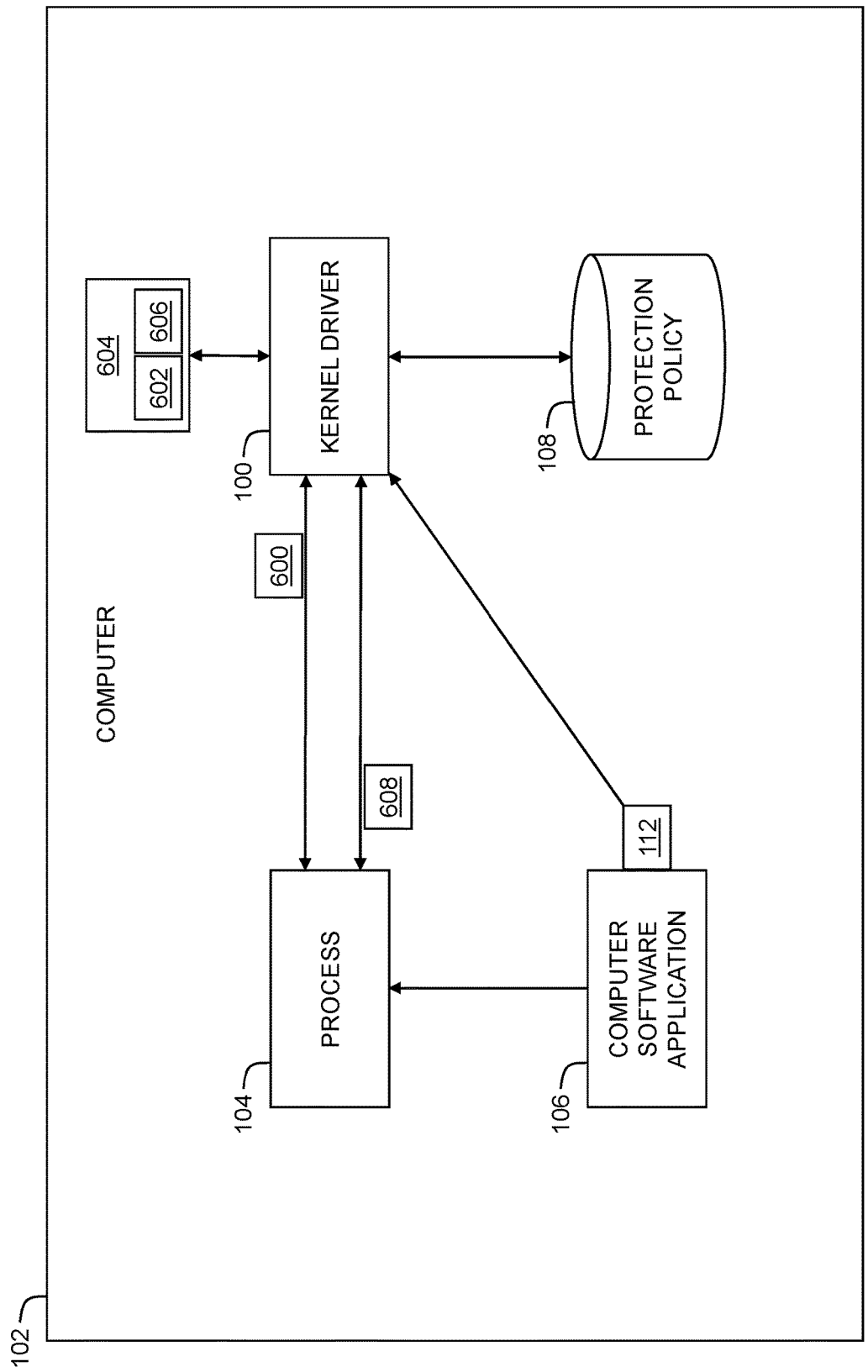
FIG. 6 is a simplified conceptual illustration of a computer security system, constructed and operative in accordance with an embodiment of the invention.
Figure 7:
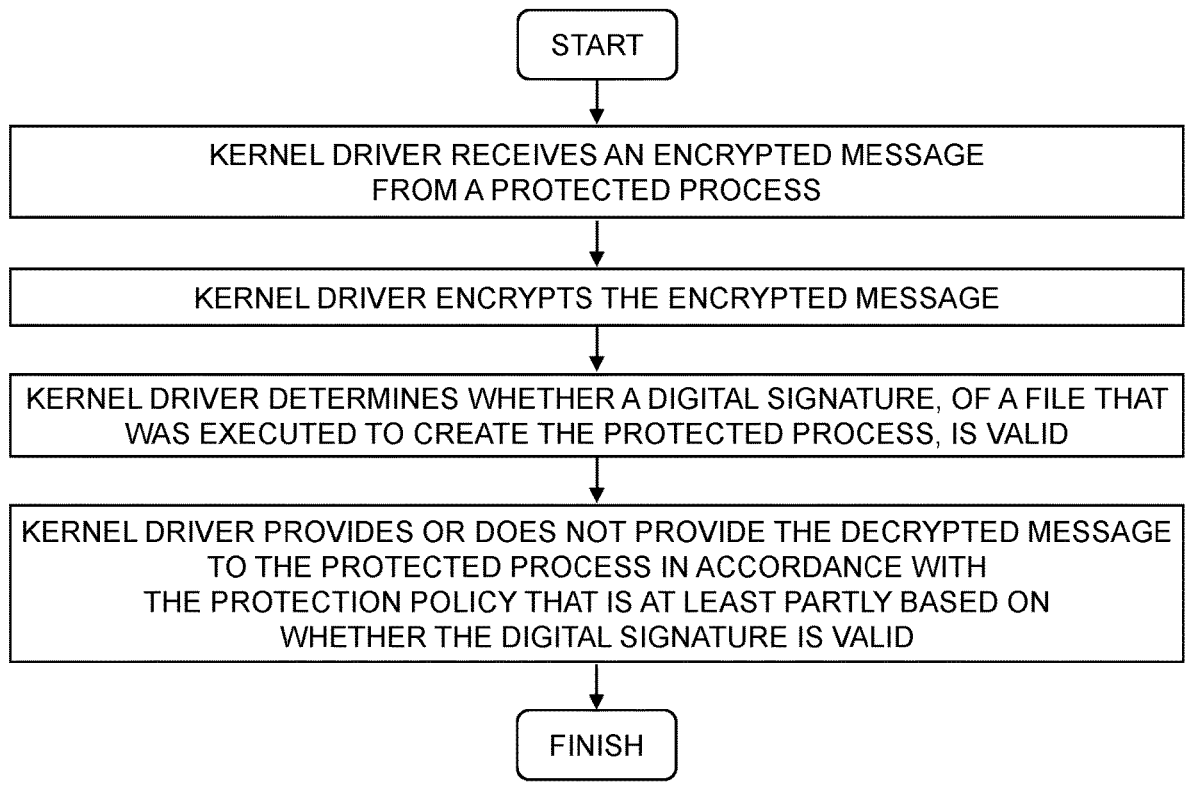
FIG. 7 is a simplified flowchart diagram of an exemplary method of operation of the system of FIG. 6, operative in accordance with an embodiment of the invention.

Reference is now made to FIG. 6, which is a simplified conceptual illustration of a computer security system, constructed and operative in accordance with an embodiment of the invention, and additionally to FIG. 7, which is a simplified flowchart diagram of an exemplary method of operation of the system of FIG. 6, operative in accordance with an embodiment of the invention. The system of FIG. 6 is substantially similar to the system of FIG. 1 except as is otherwise described hereinbelow. In the system of FIG. 6 and method of FIG. 7, kernel driver 100 is configured to receive a message 600 from process 104, where message 600 is encrypted in accordance with conventional techniques, such as using a public key 602 of a key pair 604 that also includes a private key 606, prior to kernel driver 100 receiving message 600. Kernel driver 100 decrypts encrypted message 600, such as using private key 606, encrypts a response 608, such as using private key 606, and provides the encrypted response 608 to process 104. In one embodiment, kernel driver 100 determines, as described above, whether digital signature 112 of process 104's executable file, is valid, and then provides, or doesn't provide, encrypted response 608 to process 104 in accordance with protection policy 108, where protection policy 108 is at least partly based on whether the digital signature is valid.

Any aspect of the invention described herein may be implemented in computer hardware and/or computer software embodied in a non-transitory, computer-readable medium in accordance with conventional techniques, the computer hardware including one or more computer processors, computer memories, I/O devices, and network interfaces that interoperate in accordance with conventional techniques.

It is to be appreciated that the term "processor" or "device" as used herein is intended to include any processing device, such as, for example, one that includes a CPU (central processing unit) and/or other processing circuitry. It is also to be understood that the term "processor" or "device" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

Embodiments of the invention may include a system, a method, and/or a computer program product. The computer program product may include a computer readable storage medium (or media) having computer readable program instructions thereon for causing a processor to carry out aspects of the invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the invention.

Aspects of the invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart illustrations and block diagrams in the drawing figures illustrate the architecture, functionality, and operation of possible implementations of systems, methods, and computer program products according to various embodiments of the invention. In this regard, each block in the flowchart illustrations or block diagrams may represent a module, segment, or portion of computer instructions, which comprises one or more executable computer instructions for implementing the specified logical function(s). In some alternative implementations, the functions noted in a block may occur out of the order noted in the drawing figures. For example, two blocks shown in succession may, in fact, be executed substantially concurrently, or the blocks may sometimes be executed in the reverse order, depending upon the functionality involved. It will also be noted that each block of the flowchart illustrations and block diagrams, and combinations of such blocks, can be implemented by special-purpose hardware-based and/or software-based systems that perform the specified functions or acts.

The descriptions of the various embodiments of the invention have been presented for purposes of illustration, but are not intended to be exhaustive or limited to the embodiments disclosed. Many modifications and variations will be apparent to those of ordinary skill in the art without departing from the scope and spirit of the described embodiments.

What is claimed is:

1. A computer security method comprising:
   protecting a process of a first computer software application executed by a computer, where the protecting is performed in accordance with a protection policy;
   receiving an instruction from the process to modify the protection policy;
   modifying the protection policy in accordance with the instruction; and
   protecting the process in accordance with the protection policy after it has been modified in accordance with the instruction,
   wherein the protecting, receiving, and modifying are performed by a kernel driver executed by the computer.

2. The computer security method according to claim 1 wherein the first computer software application is a web browser.

3. The computer security method according to claim 1 wherein any of the protecting, receiving, and modifying are performed after determining that a digital signature is valid, wherein the digital signature is of an executable file of the first computer software application, and wherein the determining is performed by the kernel driver executed by the computer.

4. The computer security method according to claim 1 wherein the protecting comprises:
   detecting an attempt, by a process of a second computer software application executed by the computer, to access an object associated with the first computer software application;
   determining whether a digital signature is valid, wherein the digital signature is of an executable file of the second computer software application; and
   allowing or preventing access to the object by the second computer software application in accordance with the protection policy, wherein the protection policy is at least partly based on whether the digital signature is valid,
   wherein the detecting, determining, allowing, and preventing are performed by the kernel driver executed by the computer.

5. The computer security method according to claim 4 wherein the object is a process or a thread of a process.

6. The computer security method according to claim 1 wherein the protecting comprises:
   receiving a decryption key from the process of the first computer software application;
   receiving a request from the process of the first computer software application to receive the decryption key;
   determining whether a digital signature is valid, wherein the digital signature is of the first computer software application; and
   providing or not providing the decryption key to the process in accordance with the protection policy, wherein the protection policy is at least partly based on whether the digital signature is valid,
   wherein the receiving, determining, allowing, providing, and not providing are performed by the kernel driver executed by the computer.

7. The computer security method according to claim 6 wherein the decryption key is encrypted after receiving the decryption key from the process of the first computer software application, and further comprising decrypting the encrypted decryption key, if the digital signature is valid, prior to providing the decryption key to the process of the first computer software application.

8. The computer security method according to claim 1 wherein the protecting comprises:
   receiving an encrypted message from the process of the first computer software application, where the message is encrypted using a public key of a key pair;
   determining whether a digital signature is valid, wherein the digital signature is of an executable file of the first computer software application; and
   if the digital signature is valid,
      decrypting the encrypted message using a private key of the key pair,
      encrypting a response to the message using the private key, and
      providing the encrypted response to the process of the first computer software application,
   wherein the receiving, determining, decrypting, encrypting, and providing are performed by the kernel driver executed by the computer.

9. Computer security apparatus comprising:
   a kernel driver configured to be executed by a computer in a kernel mode and thereupon to perform
      protecting a process of a first computer software application executed by the computer, where the protecting is performed in accordance with a protection policy,
      receiving an instruction from the process to modify the protection policy,
      modifying the protection policy in accordance with the instruction, and
      protecting the process in accordance with the protection policy after it has been modified in accordance with the instruction.

10. The computer security apparatus according to claim 9 wherein the first computer software application is a web browser.

11. The computer security apparatus according to claim 9 wherein the kernel driver is configured to perform any of the protecting, receiving, and modifying after the kernel driver determines that a digital signature is valid, wherein the digital signature is of an executable file of the first computer software application.

12. The computer security apparatus according to claim 9 wherein the kernel driver is configured to perform the protecting by
   detecting an attempt, by a process of a second computer software application executed by the computer, to access an object associated with the first computer software application,
   determining whether a digital signature is valid, wherein the digital signature is of an executable file of the second computer software application, and
   allowing or preventing access to the object by the second computer software application in accordance with the protection policy, wherein the protection policy is at least partly based on whether the digital signature is valid.

13. The computer security apparatus according to claim 12 wherein the object is a process or a thread of a process.

14. The computer security apparatus according to claim 9 wherein the kernel driver is configured to perform the protecting by
   receiving a decryption key from the process of the first computer software application;
   receiving a request from the process of the first computer software application to receive the decryption key;
   determining whether a digital signature is valid, wherein the digital signature is of the first computer software application; and
   providing or not providing the decryption key to the process in accordance with the protection policy, wherein the protection policy is at least partly based on whether the digital signature is valid,
   wherein the receiving, determining, allowing, providing, and not providing are performed by the kernel driver executed by the computer.

15. The computer security apparatus according to claim 14 wherein the kernel driver is configured to encrypt the decryption key after receiving the decryption key from the process of the first computer software application, and decrypt the encrypted decryption key, if the digital signature is valid, prior to providing the decryption key to the process of the first computer software application.

16. The computer security apparatus according to claim 9 wherein the kernel driver is configured to perform the protecting by receiving an encrypted message from the process of the first computer software application, where the message is encrypted using a public key of a key pair, determining whether a digital signature is valid, wherein the digital signature is of an executable file of the first computer software application, and if the digital signature is valid,
- decrypting the encrypted message using a private key of the key pair,
- encrypting a response to the message using the private key, and
- providing the encrypted response to the process of the first computer software application.

\* \* \* \* \*